United States Patent
Scoullar et al.

(10) Patent No.: US 8,812,268 B2
(45) Date of Patent: Aug. 19, 2014

(54) METHOD AND APPARATUS FOR RESOLVING PILED-UP PULSES BY USING A MATHEMATICAL TRANSFORM

(75) Inventors: Paul Andrew Basil Scoullar, Melbourne (AU); Christopher Charles McLean, Melbourne (AU)

(73) Assignee: Southern Innovation International Pty. Ltd., Carlton North Victoria (AU)

( * ) Notice: Subject to any disclaimer, the term of this patent is extended or adjusted under 35 U.S.C. 154(b) by 371 days.

(21) Appl. No.: 13/139,517

(22) PCT Filed: Dec. 18, 2009

(86) PCT No.: PCT/AU2009/001648
§ 371 (c)(1),
(2), (4) Date: Jun. 14, 2011

(87) PCT Pub. No.: WO2010/068996
PCT Pub. Date: Jun. 24, 2010

(65) Prior Publication Data
US 2011/0251828 A1    Oct. 13, 2011

Related U.S. Application Data

(60) Provisional application No. 61/138,879, filed on Dec. 18, 2008.

(51) Int. Cl.
*G06F 15/00* (2006.01)
*G01V 1/28* (2006.01)

(52) U.S. Cl.
CPC ........................................ *G01V 1/28* (2013.01)
USPC ................. 702/189; 702/56; 702/66; 702/76; 702/182

(58) Field of Classification Search
USPC ......... 702/34, 40, 56, 66, 75, 76, 77, 85, 182, 702/189; 73/570, 579
See application file for complete search history.

(56) References Cited

U.S. PATENT DOCUMENTS 4,289,141 A    9/1981   Cormier
5,210,423 A    5/1993   Arseneau
(Continued)

FOREIGN PATENT DOCUMENTS

CN    101666227    3/2010
JP    10186041     7/1998
(Continued)

OTHER PUBLICATIONS

Douglas et al., Estimating the Firing Depth of Underground Explosions, Nature (1972), 237: 26-28.

(Continued)

*Primary Examiner* — Carol S Tsai
(74) *Attorney, Agent, or Firm* — Knobbe, Martens, Olson & Bear, LLP (57) ABSTRACT

A method and apparatus for resolving individual signals in detector output data, the method comprising obtaining or expressing the detector output data as a digital series, obtaining or determining a signal form of signals present in the data, forming a transformed signal form by transforming the signal form according to a mathematical transform, forming a transformed series by transforming the digital series according to the mathematical transform, the transformed series comprising transformed signals, evaluating a function of at least the transformed series and the transformed signal form and thereby providing a function output, determining at least one parameter of the function output based on a model of the function output, and determining a parameter of the signals from the at least one determined parameter of the function output. The method may include forming the model by modelling the function output.

20 Claims, 7 Drawing Sheets

(56) References Cited

U.S. PATENT DOCUMENTS

| | | |
|---|---|---|
| 5,225,682 A | 7/1993 | Britton et al. |
| 5,349,193 A | 9/1994 | Mott et al. |
| 5,349,195 A | 9/1994 | Dumont |
| 5,532,944 A | 7/1996 | Battista |
| 5,884,234 A | 3/1999 | Jorion et al. |
| 6,057,551 A | 5/2000 | Tararine |
| 6,128,092 A | 10/2000 | Lévesque et al. |
| 6,160,259 A | 12/2000 | Petrillo et al. |
| 6,215,122 B1 | 4/2001 | Clifford et al. |
| 6,590,957 B1 | 7/2003 | Warburton et al. |
| 6,721,673 B2 * | 4/2004 | Rao ................................ 702/76 |
| 6,868,348 B1 * | 3/2005 | Stoutenburg et al. ........... 702/56 |
| 7,124,042 B2 * | 10/2006 | Rao ................................ 702/76 |
| 7,139,350 B2 | 11/2006 | Tiller et al. |
| 7,383,142 B2 * | 6/2008 | Scoullar et al. ................ 702/66 |
| 7,411,584 B2 * | 8/2008 | Hill et al. ...................... 345/177 |
| 7,439,515 B2 | 10/2008 | Bak |
| 7,725,281 B2 | 5/2010 | Jordanov |
| 7,763,859 B2 | 7/2010 | Mott |
| 7,817,762 B2 | 10/2010 | Johnstone et al. |
| 7,999,220 B2 | 8/2011 | Odom |
| 8,059,107 B2 * | 11/2011 | Hill et al. ...................... 345/177 |
| 8,227,761 B2 | 7/2012 | Zhu et al. |
| 2005/0255606 A1 | 11/2005 | Ahmed et al. |
| 2007/0147702 A1 | 6/2007 | Scoullar et al. |
| 2007/0268781 A1 | 11/2007 | Meunier et al. |
| 2010/0074397 A1 | 3/2010 | Kappler et al. |
| 2010/0270473 A1 | 10/2010 | Kraft et al. |

FOREIGN PATENT DOCUMENTS

| | | |
|---|---|---|
| JP | 2001337168 | 12/2001 |
| JP | 3836629 B2 | 10/2006 |
| JP | 3907910 B2 | 4/2007 |
| JP | 3980451 B2 | 9/2007 |
| JP | 2009229127 | 10/2009 |
| JP | 4358814 B2 | 11/2009 |
| JP | 4706566 B2 | 6/2011 |
| JP | 4787989 B2 | 10/2011 |
| KR | 20110120015 | 11/2011 |
| WO | WO 94/28438 | 12/1994 |
| WO | WO 97/07591 | 2/1997 |
| WO | WO 99/58999 | 11/1999 |
| WO | WO 00/39600 | 7/2000 |
| WO | WO 02/097471 | 12/2002 |
| WO | WO 03/040757 | 5/2003 |
| WO | WO 2005/121835 | 12/2005 |
| WO | WO 2005/121988 | 12/2005 |
| WO | WO 2006/029475 | 3/2006 |
| WO | WO 2007/049168 | 5/2007 |
| WO | WO 2007/146350 | 12/2007 |
| WO | WO 2008/089014 | 7/2008 |
| WO | WO 2008/155679 | 12/2008 |
| WO | WO 2009/020863 | 2/2009 |
| WO | WO 2009/020866 | 2/2009 |
| WO | WO 2009/032452 | 3/2009 |
| WO | WO 2009/050619 | 4/2009 |
| WO | WO 2009/059312 | 5/2009 |
| WO | WO 2009/076256 | 6/2009 |
| WO | WO 2009/121132 | 10/2009 |
| WO | WO 2010/014576 | 2/2010 |
| WO | WO 2011/002452 | 1/2011 |
| WO | WO 2011/023431 | 3/2011 |
| WO | WO 2011/039312 | 4/2011 |
| WO | WO 2012/029496 | 3/2012 |
| WO | WO 2012/088781 | 7/2012 |

OTHER PUBLICATIONS

Knoll et al., Radiation Detection and Measurement, John Wiley and Sons, NY 2000, 3$^{rd}$ Edition, Chapter 17, pp. 632-634 and 658-659.
Komar et al., Digital signal processing for BGO detectors, Nucl Instr Meth A, (1993) 336: 246-252.
Press et al., Numerical Recipes: The Art of Scientific Computing, Cambridge University Press (1986), Chapter 12.4 entitled "Convolution and Devonvolution Using the FFT", pp. 407-415.
Pullia et al., Quasi-optimum X and gamma spectroscopy based on real-time digital techniques, Nucl Instr Meth. A, (2000) 439:378-384.
Saito, Naoki, Superresolution of Noisy Band-Limited Data by Data Adaptive Regularization and its Application to Seismic Trace Inversion, CH2847-2/90/0000-123, (1990).
Smith, Steven W., The Scientist and Engineer's Guide to Digital Signal Processing, California Technical Publishing (1997), Chapter 17 entitled "Custom Filters", pp. 297-310.
International Search Report dated Apr. 23, 2010 for Application No. PCT/AU2009/001648, filed Dec. 18, 2009.
International Preliminary Report on Patentability dated Jun. 11, 2011 and Written Opinion for Application No. PCT/AU2009/001648, filed Dec. 18, 2009.

* cited by examiner

METHOD AND APPARATUS FOR RESOLVING PILED-UP PULSES BY USING A MATHEMATICAL TRANSFORM

RELATED APPLICATION

This application is based on and claims the benefit of the filing date of U.S. application No. 61/138,879 filed 18 Dec. 2008, the content of which as filed is incorporated herein by reference in its entirety.

FIELD OF THE INVENTION

The present invention relates generally to the field of the detection and measurement of signals (or pulses) in the output data stream of a detector, such as a radiation detector or a sonic pulse (or other form of vibration) detector, and in particular, though not exclusively, to a method and apparatus for the recovery, from a radiation detector for example, of data affected by pulse pile-up and to a method and apparatus for resolving individual signals in detector output data.

BACKGROUND OF THE INVENTION

The accurate detection and measurement of radiation, vibration or other types of energy is employed in many industries including homeland security, scientific instrumentation, medical imaging, materials analysis, meteorology and the minerals processing industry. These and other industries use such detection and measurement to analyze materials, products or other specimens. Transmission based imaging, spectroscopic analysis or other modalities can be used to perform such analysis.

SONAR (sound navigation and ranging) is commonly used in navigation and for locating objects within a body of water. SODAR, or sonic detection and ranging, may be used to measure the scattering of sound waves by atmospheric turbulence and for example to measure wind speed at various heights above the ground, and the thermodynamic structure of the lower layer of the atmosphere.

Ultrasound may be used for medical imaging or other purposes, such as to form images of foetuses, to locate flaws in or measure the thickness of certain types of objects, or to locate objects in real-time (including in manufacturing environments).

Spectroscopy, for example, is commonly used to analyze materials. Knowledge about the material is obtained by analysis of radiation emission or absorption from elements within the specimen. This emission of radiation can be stimulated emission due to some form of incident radiation or the result of natural emission from the constituent elements.

Gamma-ray spectroscopy, for example, is a form of spectroscopy in which the emitted electromagnetic radiation is in the form of gamma-rays. In gamma-ray spectroscopy the detection of the resulting radiation is commonly performed with a scintillation crystal (such as thallium-activated sodium iodide, NaI(Tl)), though there are a number of other detector types that can also be used. NaI(Tl) crystals generate ultraviolet photons pursuant to incident gamma-ray radiation. These photons may then be directed to a photomultiplier tube (PMT) which generates a corresponding electrical signal or pulse. As a result, the interaction between the photons and the detector gives rise to pulse-like signals, the shape of which is determined by the incident gamma-ray radiation, the detecting crystal and the PMT. The fundamental form of these pulse-like signals is referred to as the impulse response of the detector.

The output from the photomultiplier is an electrical signal representing the summation of input signals, of determined form, generated in response to discrete gamma rays arriving at the scintillation crystal. By examining the detector output over time, and in particular the amplitude of the component signals, it is possible to deduce information regarding the chemical composition of the material.

Analysis by gamma-ray spectroscopy requires the characterization of the individual signals generated in response to incident gamma-rays. Signal parameters of particular interest include signal amplitude, number and time of occurrence or temporal position (whether measured as time of arrival, time of maximum or otherwise). If the arrival times of two gamma-rays differ by more than the response time of the detector, analysis of the detector output is relatively straightforward. However, in many applications a high flux of gamma-rays cannot be avoided, or may be desirable so that spectroscopic analysis can be performed in a reasonable time period. As the time between the arrivals of gamma-rays decreases, characterization of all resultant signals becomes difficult.

In particular, the analysis is affected by a phenomenon known as pulse pile-up [G. F. Knoll, *Radiation Detection and Measurement*, 3rd edition, Chapter 17, pp. 632-634, 658 and 659, John Wiley and Sons, New York 2000], whereby multiple gamma-rays arriving more or less simultaneously produce signals which sum together and may be counted as a single signal. The magnitude of this combined signal is greater than the individual components, leading to errors in later analysis.

The energy of an incident gamma-ray may be reflected in the amplitude of the pulse-like signal produced by the detector. The presence of specific gamma-ray energies within the detector signal is indicative of particular elements in the material from which gamma-rays originate. Thus, a failure to differentiate a large amplitude signal caused by a single scintillation event from the superposition of multiple events can have a serious effect on the accuracy of subsequent spectroscopic analysis.

DISCUSSION OF THE BACKGROUND ART

Some existing techniques aim to prevent corruption of signal analysis due to pulse pile-up. Certain pulse shaping electronics have been shown to reduce the response time of the detector resulting in a diminished prevalence of pile-up in the final spectrum [A. Pullia, A. Geraci and G. Ripamonti, Quasioptimum γ and *X-Ray Spectroscopy Based on Real-Time Digital Techniques*, Nucl. Inst. and Meth. A 439 (2000) 378-384]. This technique is limited, however, by detector response time. Another approach is 'pulse pile-up rejection' whereby signals suspected to contain pulse pipe-up are discarded. Only signals free from pulse pile-up are used in spectroscopic analysis. However, as the rate of radiation incident on the detector increases, so too does the likelihood that pulse pile-up will occur and the more it is necessary to discard data. Accordingly, existing pulse pile-up rejection is of limited usefulness since a state is quickly reached beyond which a higher incident radiation flux ceases to reduce the time needed for analysis, as an increasing percentage of data must be rejected.

A more sophisticated approach is to make use of prior knowledge about the profile of a single pulse from the detector or to model mathematically the parameters of a signal. It is then possible in principle to distinguish signals or pulses that originate from a single event from those caused by pulse pile-up. In one such method of analysis [R. J. Komar and H.-B. Mak, *Digital signal processing for BGO detectors*, Nucl. Inst. and Meth. A 336 (1993) 246-252], signals that depart from the simple profile are selected for subsequent analysis. This analysis involves fitting, via an iterative process, two pulses of varying separation and amplitude. Once the fit has been determined, the characteristics of the individual pulses are known from the fitting parameters and hence a pulse arising from two closely occurring signals can be decomposed into the corresponding discrete signals. However, this approach fails to accommodate circumstances where pulse pile-up is caused by the superposition of more than two signals. The iterative optimization is computationally expensive and the time taken to carry out this procedure renders it impractical in most situations.

Pulse pile-up is also a problem in seismic data collection; Naoki Saito (in *Superresolution of Noisy Band-Limited Data by Data Adaptive Regularization and its Application to Seismic Trace Inversion*, CH2847-2/90/0000-123, 1990) teaches a technique for resolving closely placed spikes in a seismic trace. The disclosed technique employs data adaptive regularization to recover missing frequency information in the presence of noise and, through repeated iteration, obtain improved resolution. However, this approach is computationally intensive.

SUMMARY OF THE INVENTION

According to a first aspect of the invention, therefore, there is provided a method for resolving individual signals in detector output data, comprising:
- obtaining or expressing the detector output data as a digital series (such as a digital time series or a digitized spectrum);
- obtaining or determining a signal form (or equivalently the impulse response) of signals present in the data;
- forming a transformed signal form by transforming the signal form according to a mathematical transform;
- forming a transformed series by transforming the digital series according to the mathematical transform, said transformed series comprising transformed signals;
- evaluating a function of at least the transformed series and the transformed signal form (and optionally of at least one parameter of the transformed signals) and thereby providing a function output;
- determining at least one parameter of the function output based on a model of the function output; and
- determining a parameter of the signals from the at least one determined parameter of the function output.

It will be understood by the skilled person that individual signals in detector output data may also be described as individual pulses in a detector output or in a detector output signal (in which case signal form could be referred to as pulse form).

The method may comprise forming the model by modelling the function output (such as by modelling the function output as a plurality of sinusoids).

The signal form may generally be regarded as characterising the interaction between the detector and the radiation (or other detected input) that was or is being used to collect the data. It may be determined or, if known from earlier measurements, calibrations or the like, obtained from (for example) a database.

In some embodiments, transforming the digital series according to the mathematical transform comprises forming a model of the digital series and transforming the model of the digital series according to the mathematical transform.

In certain embodiments, the method includes determining a plurality of parameters of the transformed signals, such as frequency and amplitude.

In certain particular embodiments, the transform is a Fourier transform, such as a fast fourier transform or a discrete fourier transform, or a wavelet transform. Indeed, in certain embodiments the transform may be applied somewhat differently to the signal form and digital series respectively. For example, in one embodiment the mathematical transform is the Fourier transform, but the signal form is transformed with a discrete fourier transform and the digital series is transformed with a fast fourier transform.

In one embodiment, the transform is a Fourier transform and the function is representable as $$Y(k) = X(k)/H(k)$$

where $X(k)$ is the transformed series and $H(k)$ is the transformed signal form.

Thus, this method endeavours to determine a parameter of the signals and hence of as much of the data as possible, but it will be appreciated that it may not be possible to do so for some data (which hence is termed 'corrupt data'), as is described below. It will be understood that the term 'signal' is interchangeable in this context with 'pulse', as it refers to the output corresponding to individual detection events rather than the overall output signal comprising the sum of individual signals. It will also be appreciated that the temporal position (or timing) of a signal can be measured or expressed in various ways, such as according to the time (or position in the time axis) of the maximum of the signal or the leading edge of the signal. Typically this is described as the arrival time ('time of arrival') or detection time.

It will also be understood that the term 'detector data' refers to data that has originated from a detector, whether processed subsequently by associated or other electronics within or outside the detector.

The signal form (or impulse response) may be determined by a calibration process that involves measuring the detector's impulse response (such as time domain response or frequency domain response) to one or more single event detections to derive from that data the signal form or impulse response. A functional form of this signal form may then be obtained by interpolating the data with (or fitting to the data) a suitable function such as a polynomial, exponential or spline. A filter (such as an inverse filter) may then be constructed from this detector signal form. An initial estimate of signal parameters may be made by convolution of the output data from the detector with the filter. Signal parameters of particular interest include the number of signals and the temporal position (or time of arrival) of each of the signals.

The particular signal parameters of interest can then be further refined.

The accuracy of the parameter estimation can be determined or 'validated' by comparing a model of the detector data stream (constructed from the signal parameters and knowledge of the detector impulse response) and the actual detector output. Should this validation process determine that some parameters are insufficiently accurate, these parameters are discarded. In spectroscopic analysis using this method, the energy parameters deemed sufficiently accurate may be represented as a histogram.

The data may include signals of different forms. In this case, the method may include determining where possible the signal form of each of the signals.

In one embodiment, the method includes progressively subtracting from the data those signals that acceptably conform to successive signal forms of a plurality of signal forms, and rejecting those signals that do not acceptably conform to any of the plurality of signal forms.

In another aspect, the invention provides an apparatus for pulse pile-up recovery from data comprising a plurality of signals output from a (typically radiation, sound or vibration) detector. The term 'recovery' is used because data that would otherwise be unusable owing to pile-up is 'recovered' and rendered useable.

The apparatus of this aspect comprises a processor for receiving the data as a digital series, and is programmed to:
  obtain or determine a signal form (or equivalently the impulse response) of signals present in the data;
  form a transformed signal form by transforming the signal form according to a mathematical transform;
  form a transformed series by transforming the digital series according to the mathematical transform, said transformed series comprising transformed signals;
  evaluate a function of at least the transformed series and the transformed signal form (and optionally of at least one parameter of the transformed signals) and thereby provide a function output;
  determine at least one parameter of the function output based on a model of the function output; and
  determine a parameter of the signals from the at least one determined parameter of the function output.

The processor may be programmed to form the model by modelling the function output (such as by modelling the function output as a plurality of sinusoids).

The apparatus may include an analog to digital converter adapted to receive the data, to convert the data into digitized form, and forward the data in digitized form to the processor. This would be of particular use where the detector outputs analog data.

The apparatus may include the (typically radiation or sound) detector.

The processor may comprise a field programmable gate array (or an array thereof). Alternatively, the processor may comprise a digital signal processor (or an array thereof). In a further alternative, the processor comprises a field programmable gate array (or an array thereof) and a digital signal processor (or an array thereof). In still another embodiment, the processor comprises an ASIC (Application Specific Integrated Circuit). The apparatus may include an analog front end that includes the analog to digital converter.

The apparatus may include an electronic computing device in data communication with the processor, for controlling the processor and for displaying an output of the processor.

The pulse pile up apparatus may be, for example, a metal detector, a landmine detector, an imaging apparatus (such as a medical imaging apparatus), a mineral detection apparatus, an oil well logging apparatus, an unexploded ordnance detector, a cargo screening apparatus, a baggage screening apparatus, an X-ray fluorescence apparatus, an X-ray diffraction apparatus, an X-ray absorption spectroscopy apparatus, an X-ray backscatter apparatus, a small angle neutron scattering apparatus, an oil exploration apparatus, a scanning electron microscope apparatus, a semiconductor radiation detector (such as a silicon drift detector apparatus or a Cadmium Zinc Telluride detector apparatus), a vibration detector such as a seismic reflection apparatus, a radio detection and ranging (RADAR) apparatus, a sound navigation and ranging (SONAR) apparatus, an elemental detection and measurement apparatus, a radiation safety detection apparatus, a biological assay apparatus (such as a flow cyclometry apparatus or a radioimmunoassay) or a superconducting apparatus (such as a superconducting tunnel junction apparatus or a superconducting calorimeter).

According to another aspect of the invention, there is provided a method for pulse pile-up recovery from detector output data, comprising:
  obtaining or expressing the detector output data as a digital series;
  obtaining or determining a signal form (or equivalently the impulse response) of signals present in the data;
  forming a transformed signal form by transforming the signal form according to a mathematical transform;
  forming a transformed series by transforming the digital series according to the mathematical transform, said transformed series comprising transformed signals;
  evaluating a function of at least the transformed series and the transformed signal form (and optionally of at least one parameter of the transformed signals) and thereby providing a function output;
  determining at least one parameter of the function output based on a model of the function output; and
  determining a parameter of the signals from the at least one determined parameter of the function output.

The method may comprise forming the model by modelling the function output (such as by modelling the function output as a plurality of sinusoids).

According to another aspect of the invention, there is also provided an apparatus for resolving individual signals in detector output data, the apparatus comprising a processor configured to:
  obtain a signal form characterizing the detector;
  obtain digitized detector output data in a form of a digital time series;
  make parameter estimates of one or more parameters of at least one signal present in the detector output data, wherein the one or more parameters comprise at least a signal temporal position of the at least one signal; and
  determine the amplitude of the at least one signal based on a mathematical model, the amplitude being indicative of a event;
  wherein the mathematical model is based on the digital time series and a function of at least the signal form, the temporal position of the at least one signal, and the amplitude of the at least one signal, and said apparatus is provided in or constitutes:
    a sonic pulse, sound or seismic detector,
    a vibration detector,
    biological assay apparatus,
    a nucleic acid sequencing system,
    a radar system,
    a reflection seismology system, or
    a semiconductor analysis system.

The processor may be configured to form the mathematical model.

Similarly, according to this aspect, the invention provides a sonic pulse, sound or seismic detector, a vibration detector, a biological assay apparatus, a nucleic acid sequencing system, a radar system, a reflection seismology system, or a semiconductor analysis system comprising a processor configured to:
  obtain a signal form characterizing the detector;
  obtain digitized detector output data in a form of a digital time series;
  make parameter estimates of one or more parameters of at least one signal present in the detector output data, wherein the one or more parameters comprise at least a signal temporal position of the at least one signal; and
  determine the amplitude of the at least one signal based on the mathematical model, the amplitude being indicative of a event;

wherein the mathematical model is based on the digital time series and a function of at least the signal form, the temporal position of the at least one signal, and the amplitude of the at least one signal.

According to this aspect, the invention also provides a method of resolving individual signals in detector output data, the method comprising:

obtaining a signal form characterizing the detector;

obtaining digitized detector output data in a form of a digital time series;

making parameter estimates of one or more parameters of at least one signal present in the detector output data, wherein the one or more parameters comprise at least a signal temporal position of the at least one signal; and determining the amplitude of the at least one signal based on said mathematical model, the amplitude being indicative of an event;

wherein the mathematical model is based on the digital time series and a function of at least the signal form, the temporal position of the at least one signal, and the amplitude of the at least one signal; and wherein said method is employed in or with a sonic pulse, sound or seismic detector, a vibration detector, a biological assay apparatus, a nucleic acid sequencing system, a radar system, a reflection seismology system, or a semi-conductor analysis system.

The method may comprise forming the mathematical model.

It should be noted that the various optional features of each aspect of the invention may be employed were suitable and desired with any of the other aspects of the invention.

BRIEF DESCRIPTION OF THE DRAWINGS

In order that the invention may be more clearly ascertained, preferred embodiments will now be described, by way of example only, with reference to the accompanying drawing, in which.

DETAILED DESCRIPTION OF THE INVENTION

The present applicant proposed a new pulse pile-up recovery approach in WO 2006029475 and US 2007/0147702, and the content of WO 2006029475 and US 2007/0147702 are incorporated herein by reference to further support this detailed description, and to provide additional understanding of some features of the present invention.

Figure 1:
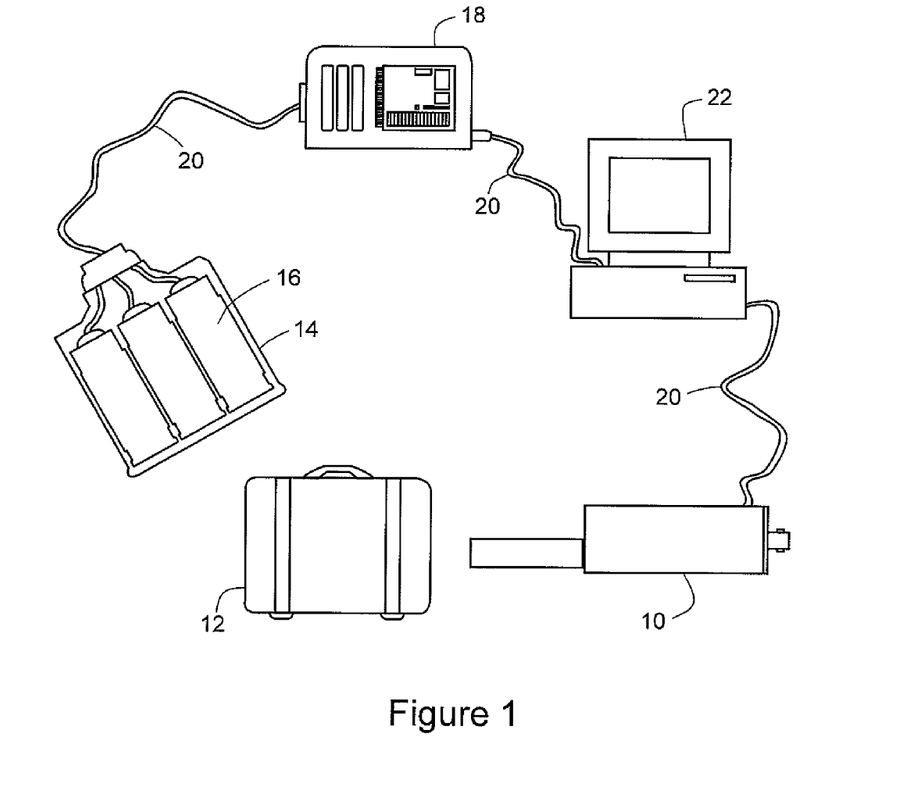
FIG. 1 is a view of a gamma-ray spectroscopy apparatus according to an embodiment of the present invention.

FIG. 1 is a schematic view of a gamma-ray spectroscopy apparatus adapted to perform pulse pile-up recovery according to an embodiment of the present invention, with an item to be analyzed. The apparatus of FIG. 1 includes a neutron generator (10) for generating neutrons for interacting with an item under analysis or specimen (12), and a detector unit (14), in the form of a scintillation based gamma-ray radiation detector, for detecting gamma-ray radiation resulting from the interaction of neutrons and the specimen (12). The detector unit includes sensors or detector elements (16) that each has a scintillation crystal (in this example, sodium iodide) coupled to a photomultiplier tube (not shown). It will be appreciated that the apparatus could readily be modified for other applications, particularly by substituting a different form of detector unit, to detect other forms of radiation (whether electro-magnetic, neutron, gamma-ray, x-ray, light, acoustic, or otherwise).

The apparatus also includes a signal processing unit (18) that comprises two parts: 1) an analog to digital converter that produces a digital output corresponding to the analog output of the detector unit, and 2) a processing unit which implements digital signal processing (DSP) routines in accordance with the invention. The electrical output signals of the photomultiplier tubes are connected to the signal processing unit. The apparatus also includes cables (20) and a computer (22) for display, the former for coupling the output from the signal processing unit to the computer (22).

Figure 2:
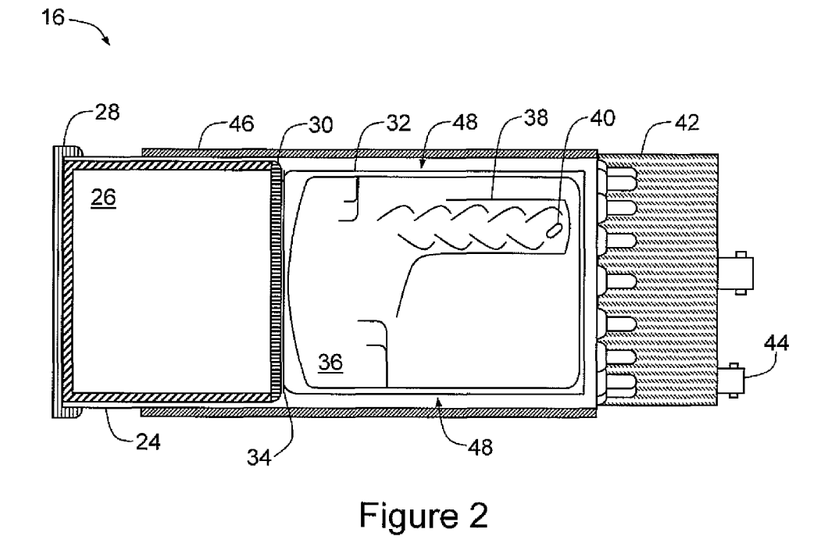
FIG. 2 is a view of a Sodium Iodide NaI(Tl) gamma-ray detector of the apparatus of FIG. 1.

FIG. 2 is a view of one of the detector elements (16). The illustrated detector element is in the form of a NaI(Tl) scintillation based gamma-ray detector, and comprises a cylindrical housing in the form of aluminium body (24) with a NaI(Tl) crystal (26) located therein at one (forward) end positioned between an aluminium outer end cap (28) (forward of the NaI(Tl) crystal (26)) and an inner optical window (30) (rearward of the NaI(Tl) crystal (26)). The detector includes a photomultiplier tube (32) rearward of the optical window (30). Optical coupling fluid (34) may be used between the NaI(Tl) crystal (26) and the optical window (30), and between the optical window (30) and the photomultiplier tube (32).

When a gamma-ray interacts with the detector by passing into the detector through the end cap (28), energy is transferred from the gamma-ray to electrons within the NaI(Tl) crystal (26). Upon the emission of ultra-violet photons the electrons lose said energy) promoting electrons within the crystal to excited states. Upon the emission of ultra-violet photons the electrons decay to lower energy states. The aforementioned ultra-violet photons pass through the optical window to the photocathode (36) of the photomultiplier tube (32) where they are converted into photoelectrons and subsequently multiplied by an electron multiplier (38) before arriving at the anode (40) of the photomultiplier tube (32). A further multiplication stage can be provided by a preamplifier (42). In this manner an electrical signal, whose amplitude is proportional to the energy of the incident gamma-rays, is present at the detector output terminals (44) of the detector. It will also be appreciated that the detector may additionally include a mu metal magnetic shield (46) located about the sides (48) of the photomultiplier tube (32) and extending forwardly of the photomultiplier tube (32) sufficiently far to surround a portion of the NaI(Tl) crystal (26).

Scintillation detectors of this kind have high efficiencies, that is, exhibit a high probability of detecting an incident gamma-ray. However, they also exhibit a relatively long detector response time and are thus prone to pulse pile-up. That is, the output, which ideally consists of completely discrete pulses each corresponding to the incidence of a single gamma-ray, instead exhibits a waveform in which individual pulses can overlap making them difficult to characterize. (The effect of pulse pile-up is illustrated in FIGS. 3a, 3b and 3c of US 2007/0147702, which show illustrative signals or pulses plotted as energy E versus time t.)

The pulse pile up apparatus may take a number of different forms depending on the implementation, for example, a metal detector, a landmine detector, an imaging apparatus (such as a medical imaging apparatus), a mineral detection apparatus, an oil well logging apparatus, an unexploded ordnance detector, a cargo screening apparatus, a baggage screening apparatus, an X-ray fluorescence apparatus, an X-ray diffraction apparatus, an X-ray absorption spectroscopy apparatus, an X-ray backscatter apparatus, a small angle neutron scattering apparatus, a powder diffractometer apparatus, a neutron reflectometer apparatus, an oil exploration apparatus, a scanning electron microscope apparatus, a semiconductor radiation detector (such as a silicon drift detector apparatus, Cadmium Zinc Telluride detector apparatus, or a High Purity Germanium (HPGe) detector apparatus), a vibration detector such as a seismic reflection apparatus, a radio detection and ranging (RADAR) apparatus, a sound navigation and ranging (SONAR) apparatus, an elemental detection and measurement apparatus, a radiation safety detection apparatus, a biological assay apparatus (such as a flow cyclometry apparatus or a radioimmunoassay) or a superconducting apparatus (such as a superconducting tunnel junction apparatus or a superconducting calorimeter).

Signal Processing Method

Figure 3:
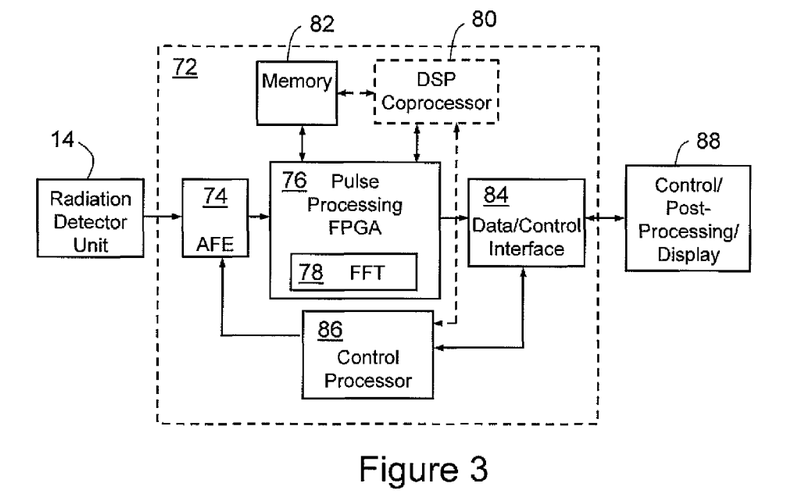
FIG. 3 is a schematic diagram of the apparatus of FIG. 1.

FIG. 3 is a schematic diagram of the functional elements of the gamma-ray spectroscopy apparatus of FIG. 1, and is provided to explain in more detail the signal processing method for pulse pile-up recovery employed by the apparatus of FIG. 1. Referring to FIG. 3, radiation detector unit (14) is connected to a pulse processing board (72) via an analog front end (AFE 74). The purpose of the AFE (74) is to digitize the signal produced by the radiation detector unit (14) by performing analog to digital conversion at, in this embodiment, 125 MHz with 12-bit conversion accuracy.

After the output of the radiation detector unit (14) has been digitized by the AFE (74), the signal processing method for pulse pile-up recovery is implemented. Referring again to FIG. 3, the digital signal produced by the AFE (74) is passed into the pulse processing Field Programmable Gate Array (FPGA) (76). The pulse processing FPGA (76), which includes a Fast Fourier Transform module (78), implements the pulse processing method of this embodiment; a digital signal processing coprocessor (80) may optionally be used to assist the pulse processing FPGA (76) to implement the pulse processing method. Variables required by the pulse processing FPGA (76) and data produced at interim steps of the pulse processing method are optionally stored in memory (82). The signal processing is controlled via a Data/Control Interface (84) which, in conjunction with a Control Processor (86), can be used to modify the implementation of the signal processing. The output data from the signal processing method can be displayed on a display (88) via the Data/Control Interface (84). Display (88) is provided in a computer that may, if desired, be used to perform post-processing and system control.

Figure 4:
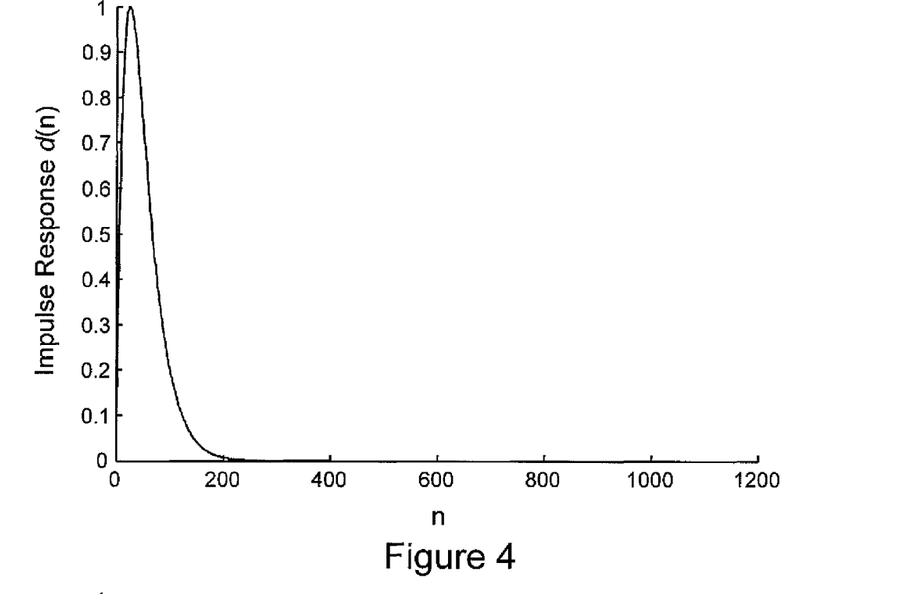
FIG. 4 is a schematic plot illustrating a typical output of the detector unit of FIG. 1 in response to a single detection event.

The pulse processing method of this embodiment is performed in the Fourier domain. The typical output response d[n] of detector unit (14) to a single detection event is illustrated in FIG. 4, while FIG. 5 is a schematic plot illustrating a typical output x[n] of detector unit (14) when multiple pulses have piled up.

Figure 5:
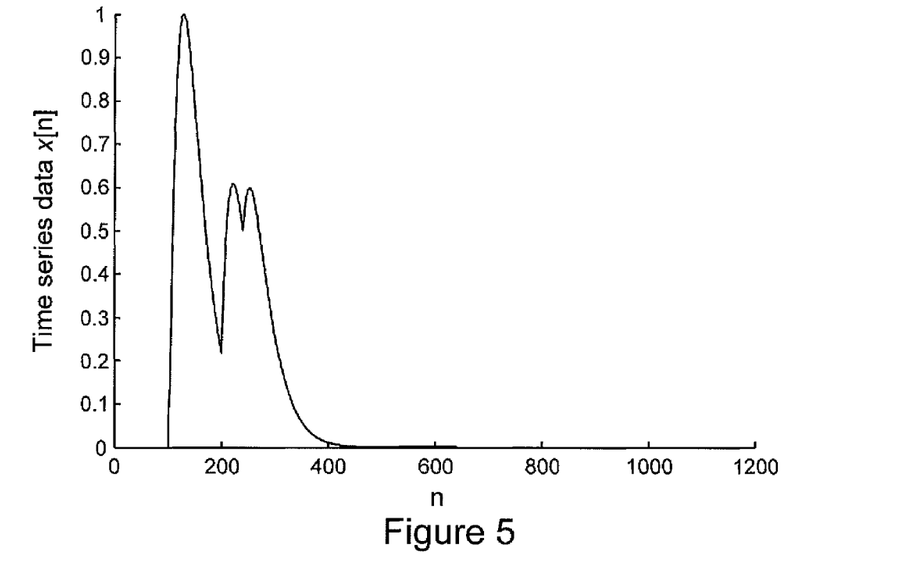
FIG. 5 is a schematic plot illustrating a typical output of the detector unit of FIG. 1 modelled as a time series of pulses.

The time series of FIG. 5 consists of four pulses occurring at times 100, 105, 200 and 240. The first three pulses each have the same amplitude; the fourth has half the amplitude of the first three. This information is not immediately apparent from an inspection of FIG. 5.

While both time of arrival and amplitude are often of interest, there exist numerous applications where only one parameter is of interest. The following two examples are given for the purposes of illustration.

(i) Amplitude of primary interest: The amplitude of pulses generated by detector unit (14) correspond to the energy of incident gamma rays, which in turn correspond to the atomic nuclei present in the region of the detector. In a material analysis application, the primary parameter of interest is the amplitude of the detector pulses, as this reveals the elemental composition of the material.

(ii) Time of arrival of primary interest: The differences in the time-of-arrival two separate detectors of two gamma rays generated by or arising from the same nuclear event can be used to infer the spatial location of the nuclear decay event. In a medical imaging application, estimating the time of arrival is likely to be of primary interest. (The energy of the events is generally known from the selection of the radio-isotope.)

While having knowledge of one parameter can assist in estimation of the other, it is not essential to have that knowledge though the resulting estimate may be considerably less accurate. For example, it is reasonably straightforward to estimate the time of arrival of pulses, without having any estimation of their amplitude. Likewise, there exist several methods for estimating the amplitude of pulses without having to estimate their time of arrival.

The effects of the time domain convolution can be removed by 'division' in the Fourier domain. This is performed by Pulse Processing FPGA 76 as follows.

Figure 6:
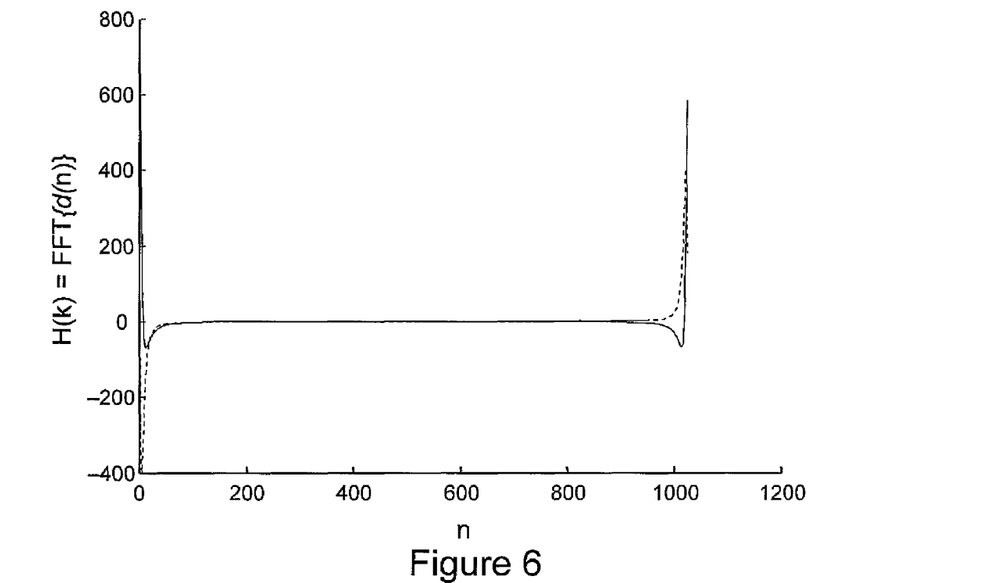
FIG. 6 is a schematic plot of the Fast Fourier Transform H(k) of the impulse response d[n] of FIG. 4, the real component shown with a solid curve, the imaginary component with a dashed curve.

FPGA (76) takes the Fast Fourier Transform H(k) of impulse response d[n]. FIG. 6 is a schematic plot of H(k) of impulse response d[n] of FIG. 4, the real component shown with a solid curve, the imaginary component with a dashed curve.

Figure 7:
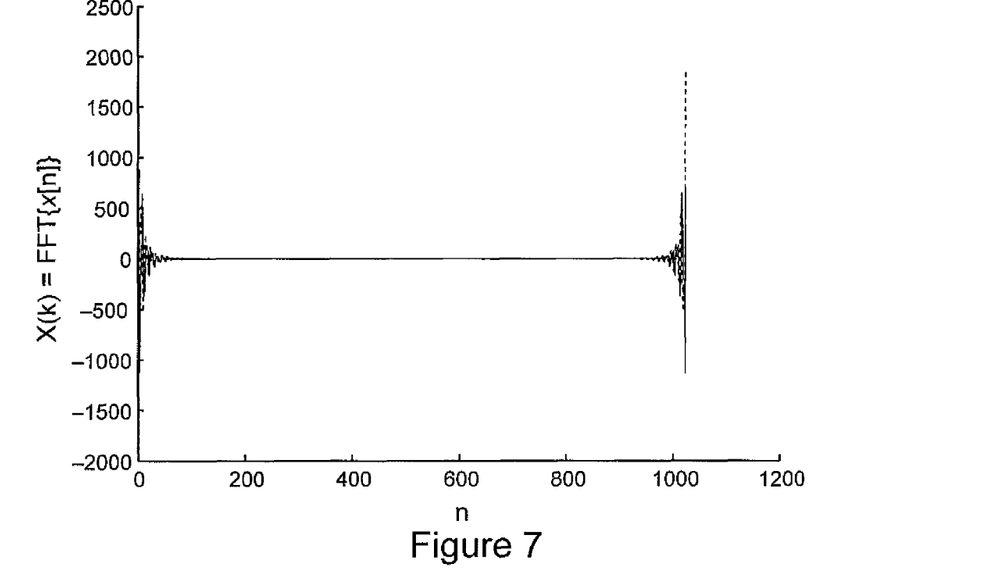
FIG. 7 is a schematic plot of the Fast Fourier Transform X(k) of the time series x[n] of FIG. 5, the real component shown with a solid curve, the imaginary component with a dashed curve.

FPGA (76) then takes the FFT of the time series data x[n] (cf. FIG. 5) and thereby forms X(k)=FFT{x[n]}. FIG. 7 is a schematic plot of X(k) of the time series x[n] of FIG. 5, the real component shown with a solid curve, the imaginary component with a dashed curve.

FPGA (76) then forms the function Y(k), which is a function of the transformed time series X(k) and the transformed signal form or impulse response H(k):

$$Y(k)=X(k)/H(k)$$

FPGA (76) then evaluates Y(k), that is, divides each element of X(k) by each corresponding element of H(k).

Figure 8:
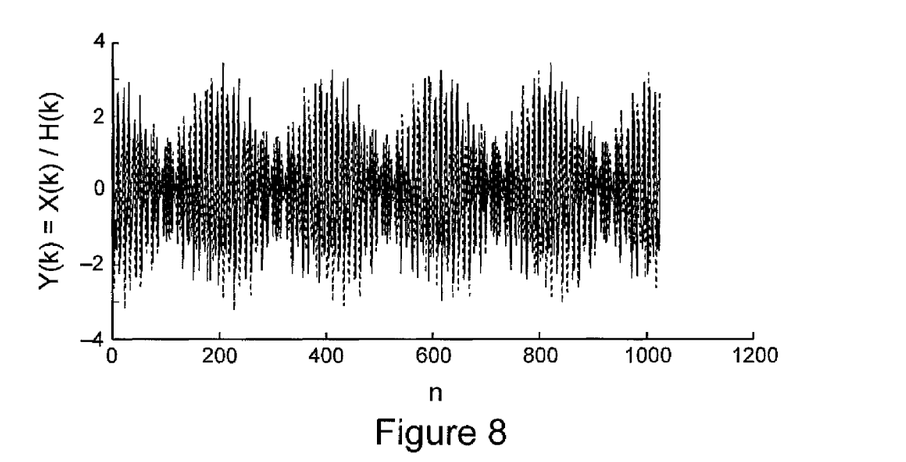
FIG. 8 is a schematic plot of the function Y(k)=X(k)/H(k) based on the data of FIGS. 6 and 7.

FIG. 8 is a schematic plot of Y(k) derived in this manner. Each pulse in the time domain is now modelled as a complex sinusoid in the Fourier domain. FIG. 8 comprises four complex sinusoids each with a respective frequency and amplitude. The amplitude of each sinusoid in the Fourier domain is related to the amplitude of each pulse in the time domain. The frequency of each sinusoid in the fourier domain is related to the time-of-arrival in the time domain.

FPGA (76) models the output of the function Y(k) as a plurality of sinusoids, either explicitly or implicitly, in order to be able to estimate parameters of those sinusoids. In this embodiment, therefore, FPGA (76) fits the plurality of sinusoids to the output and obtains estimates of the parameters of the sinusoids using known techniques, such as Maximum Likelihood, EM, Eigen-analysis, or other suitable algorithm.

The estimated amplitudes of the sinusoids can then be manipulated by FPGA (76) to obtain the energies of the pulses, hence without having estimated the time of arrival of any pulse. For greater accuracy FPGA (76) can employ both the amplitudes and frequencies of the sinusoids.

Figure 9:
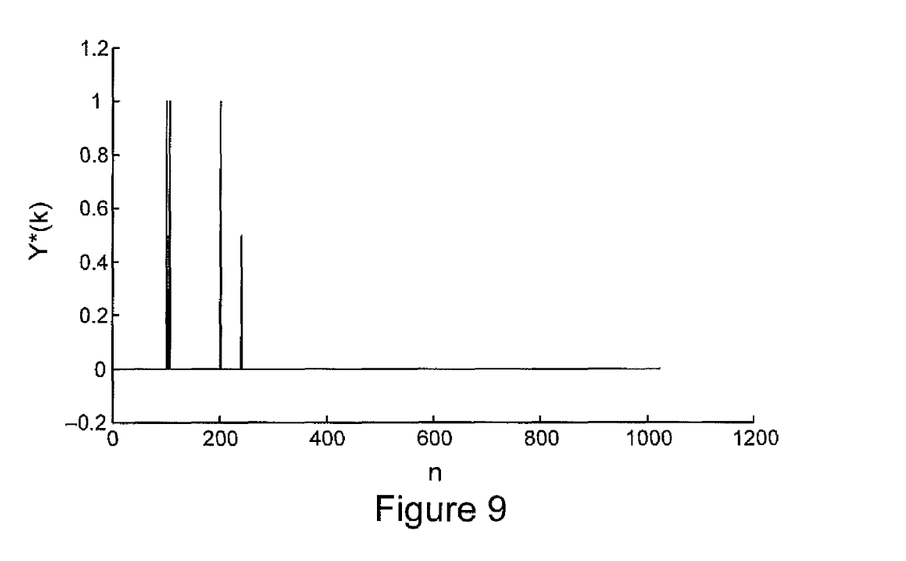
FIG. 9 is a schematic plot of the inverse FFT transform of Y(k) (of FIG. 8)

Optionally, estimates of the frequencies of the sinusoids can be transformed to obtain time of arrival information about the pulses. The inverse FFT of Y(k) is shown in FIG. 9. It will be noted that there are four 'delta' spikes at temporal position 100, 105, 200 and 240 corresponding to the time of arrival of each pulse.

Figure 10:
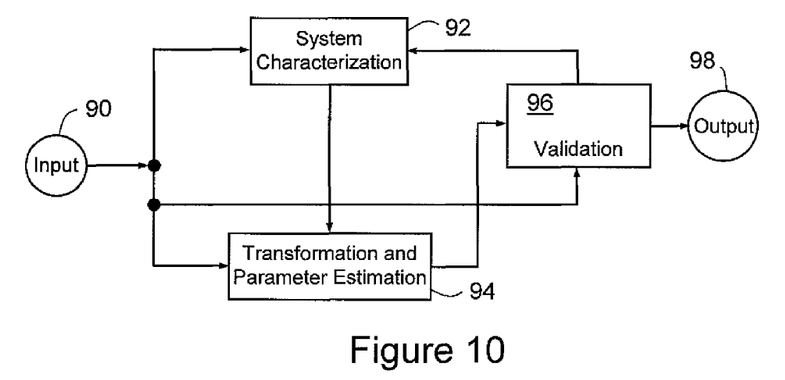
FIG. 10 is a schematic representation of the signal processing method for pulse pile-up recovery employed by the apparatus of FIG. 1 for analyzing spectroscopic data according to this embodiment of the invention.

FIG. 10 is a schematic diagram of the signal processing method for pulse pile-up recovery of radiation signals in the detector time series of this embodiment. The digitized detector signal (from AFE (74)) forms the input (90) for this signal processing method. Offline System Characterization (92) is used to determine the detector impulse response d[n] unique to the particular digitized detector signal. Characterization data generated in System Characterization phase (92) is used in a Transformation and Parameter Estimation phase (94). The Transformation and Parameter Estimation phase (94) estimates, principally operating in the Fourier domain as discussed above, the number and energies (or equivalently pulse amplitudes) of radiation signals or pulses within the digitized detector signal from the digitized detector signal and the detector impulse response. Validation (96) involves comparing the output of the Transformation and Parameter Estimation phase (94) with the digitized detector signal (90). If this comparison indicates that any of the pulse parameters have been estimated inaccurately, those parameters are rejected so that only valid data is output (98). The error signal generated in the Validation phase (96) is also employed in System Characterization (92). In circumstances where the detector impulse response may change over time, such as owing to the aging of components, temperature variations or increased radiation fluxes, System Characterization (92) updates the detector impulse response online and adaptively by employing the error signal. Such updating of the detector impulse response may be performed with any suitable adaptive method, such as least mean squares adaptation, normalized least mean squares adaptation or recursive least squares adaptation as described, for example, by S. Haykin [*Adaptive Filter Theory*, 4th Ed, Prentice Hall, 2002].

Figure 11:
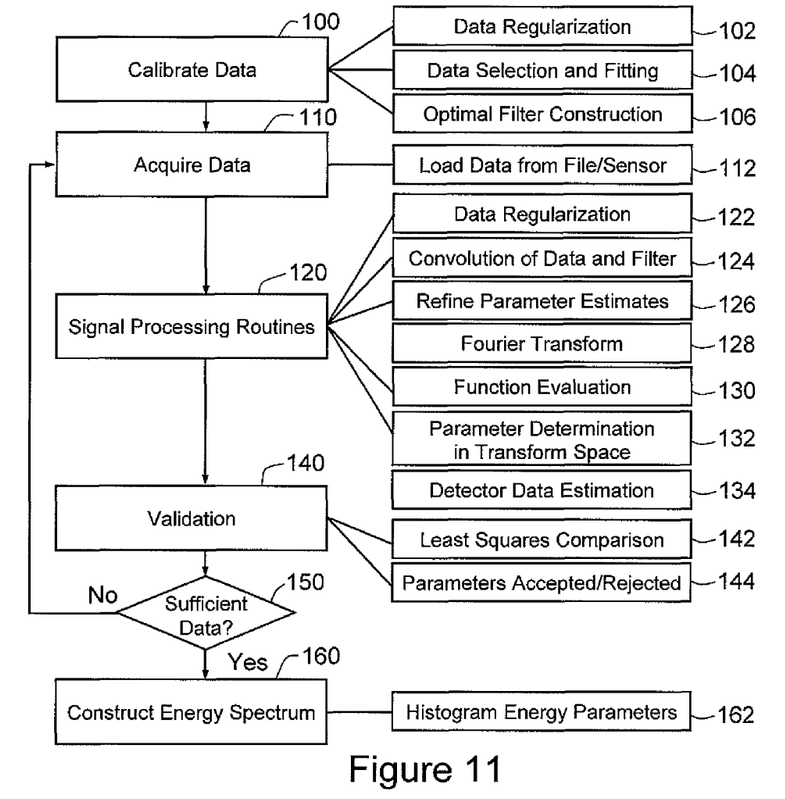
FIG. 11 is a schematic flowchart of the signal processing method for pulse pile-up recovery employed by the apparatus of FIG. 1 for analyzing spectroscopic data according to this embodiment of the invention.

FIG. 11 is a flow diagram of the signal processing method of this embodiment. At step (100), calibration is performed. This involves Data Regularization or Conditioning (102), Data Selection and Fitting (104) and Optimal Filter Construction (106). In Data Regularization (102), calibration data (signals recorded at a low incident radiation flux) are loaded from data files, the integrity of these calibration data is checked and any bias in the baseline of the data removed. Data Selection and Fitting (104) involves selecting only that data corresponding to the detection of single radiation events and constructing a data based model of the detector impulse response. A functional form of this model is then obtained by fitting a suitable function to the data, such as a polynomial, exponential or spline function. This results in the expected impulse response of the detector d[n]. Optimal Filter Construction (106) employs this detector impulse response to construct a suitable filter for the detector, such as an inverse filter or a matched filter.

At step (110) data is acquired, but may be affected by significant pulse pile-up. The data may be input (112) either from a file or directly from the detector elements (16).

At step (120) signal processing routines are applied to determine the amplitude and timing parameters of the signals in the time series. Firstly the data is conditioned (122) to remove any bias in the baseline of the data. Next, the detector data is convoluted (124) with the filter derived in step (106) to provide an initial estimate of the number of pulses (N). The estimate of the number of pulses (N) is then further refined (126) using a suitable peak detection process.

A Fourier transform is applied (128) to the digital time series and the signal form, a function of which is evaluated (130) and parameters in the transform space of that function—suitably modelled—are determined (132). Finally, from the parameters of the modelled function in transform space, an estimate is made of parameters of the original data and hence of the detector data stream ($\hat{x}[n]$) (134).

At step (140) the validation phase (96) referred to above is performed, which may be referred to as error checking as, in this embodiment, validation involves determining an error signal e[n], computed successively for the set of samples corresponding to each signal i where $1 < i < N$ (N being the total number of signals in the data stream). This error signal is calculated by determining (142) the squares of the differences between the time series data x[n] and the model based datastream ($\hat{x}[n]$ from step (132)); e[n] is thus the square of the difference between x[n] and $\hat{x}[n]$, given by:

$$e[n]=(x[n]-\hat{x}[n])^2 \qquad (6)$$

If e[n] exceeds a predetermined threshold, these parameters are rejected (144) as this condition indicates that the signal parameters do not produce a model of the respective signal that acceptably conforms to that signal (that is, is sufficiently accurate); the relevant signal is deemed to constitute corrupted data and excluded from further spectroscopic analysis. The threshold may be varied according to the data and how closely it is desired that the data be modelled; generally, therefore, in any particular specific application, the method of validation and definition of the threshold are chosen to reflect the requirements of that application.

One example of such a threshold is the signal energy $\alpha_i$ multiplied by a suitable factor, such as 0.05. Validation will, in this example, deem that the model acceptably conforms to the data constituting signal i when:

$$e[n]>0.05\alpha_i \qquad (7)$$

Validation may be performed by defining the error signal and threshold in any other suitable way. For example, the error signal may be set to the absolute value of the error. The threshold may be defined to be a multiple other than 0.05 of the signal amplitude. Another threshold comprises a number of noise standard deviations.

Decreasing the threshold (such as by decreasing the coefficient of $\alpha_i$ in Equation 7) enables improved energy resolution at lower throughput, while increasing the threshold enables improved throughput at reduced energy resolution.

At step (150) a decision is made as to whether there is sufficient data. If not, processing continues at step (110). Otherwise, the method proceeds to step (160). At step (160) a gamma-ray energy spectrum is created. The detector data stream determined at step (132), which was deemed to be of sufficient accuracy at step (144), is represented (162) in the form of a histogram. This is the gamma-ray energy spectrum on which spectroscopic analysis may be performed.

The approach of the present invention may be applied in many other fields. For example, pulse pile-up is a problem in seismic data processing. Some existing approaches are computationally intensive (even if producing good results); the method of the present invention can be applied to the processing of seismic data without excessive computational overhead such that a relatively fast and inexpensive alternative approach is provided, even if in some applications the results are not as good as are provided by some existing techniques.

Figure 12:
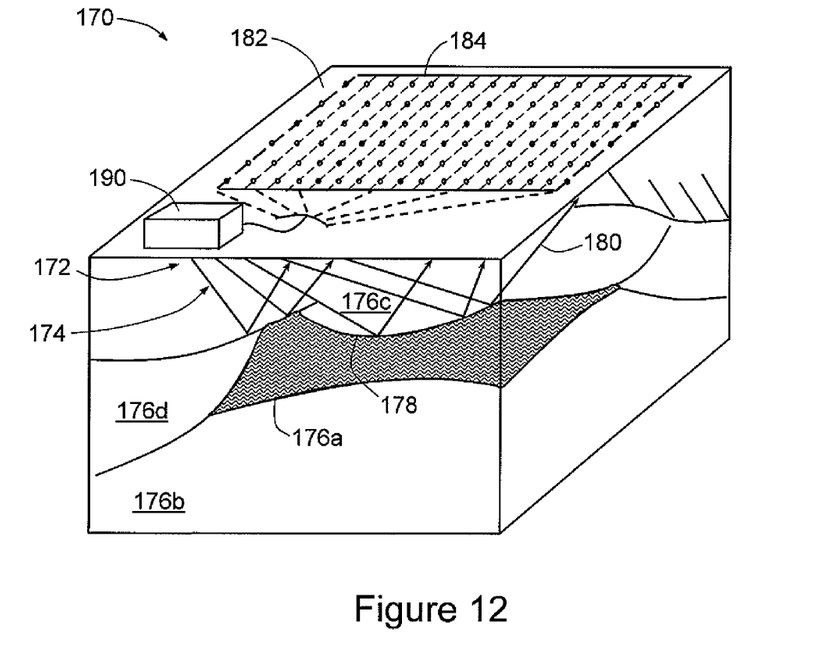
FIG. 12 is a schematic view of a reflection seismology system according to another embodiment of the present invention.

FIG. 12 is a schematic view of a reflection seismology system (170) according to another embodiment of the present invention, as used to employ sonic energy to perform subsurface exploration for—in this example—oil. Sonic reflection, or reflection seismology, is a technique for geophysical exploration using the principles of seismology to determine the properties of the subsurface environment.

Referring to FIG. 12, reflection seismology is conducted by initiating seismic waves into the Earth's subsurface at an initiation point (172) using an explosion, vibrators or specially designed air gun (not shown). The seismic waves (174) thus generated are a type of elastic wave that is conducted through the Earth. Different types of subsurface material (176a,b,c,d), such as granite, shale, gas or oil (176a), have different acoustic impedances so, when the initiated seismic waves (174) encounter a boundary (178) between materials (in this example, between materials (176a) and (176c)) with different acoustic impedances, some of the wave energy will be transmitted through the boundary and a portion of the wave energy will be reflected (180) off the boundary (178). The amplitude of the reflected wave (180) depends on the magnitude of the wave coming into the boundary, the angle at which the wave intersects the boundary and the impedance contrast between the two materials (176a,c).

Figure 13:
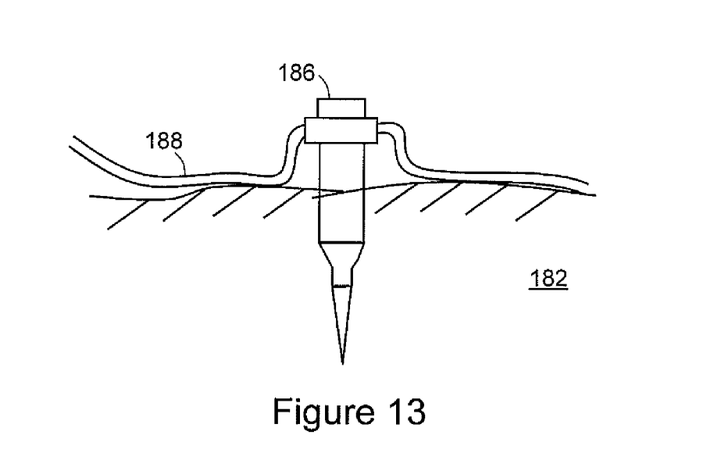
FIG. 13 is a schematic view of an exemplary geophone of the system of FIG. 12.

The portion of the seismic wave that is reflected back from boundary to the Earth's surface (182) is detected by seismometer array (184). Seismometer array (184) comprises a plurality of individual geophones that convert ground motion, induced by the reflected seismic waves, into electrical signals. An exemplary geophone is shown schematically at (186) in FIG. 13. In use, geophones (186) are coupled into the Earth's surface (182), and connected together with cables (188). The electrical signals output by the geophones (186) are then recorded at a recording station (190) for further analysis and processing. Recording station (190) includes a pulse processing board comparable to pulse processing board (72) of FIG. 3, adapted to receive and process the electrical signals output by geophones (186), to resolve individual signals in the output of geophones (186).

It should be noted that, in some applications of this technique, there may be a single detonation point with multiple sonic detectors for the recording of the reflected seismic waveforms. In other applications multiple detonation sites may be used in conjunction with a multitude of sonic detection sites to determine a more robust model of the sub surface environment.

A comparable system according to another embodiment of the present invention may be used for conducting exploration surveys in ocean environments. In this embodiment, the system comprises a ship towing an array of pneumatic air guns as an excitation source. These guns emit low frequency sound pulses (up to 300 Hz and 250 dB) into the ocean to stimulate seismic waves in the seabed below. The system also includes multiple seismic cables for detecting the reflected seismic waves; the cables—which are typically deployed in parallel—are, in this embodiment, at least 6 kilometers in length and spaced 150 meters apart, and provided with hydrophones at regular intervals along each cable to record the sound signals reflected off features beneath the seabed. The system, according to this embodiment, includes a pulse processing board (on the ship) comparable to pulse processing board (72) of FIG. 3 for receiving and processing the output of the hydrophones in order to resolve individual signals in the output of those hydrophones.

Reflection seismology is the primary form of exploration for hydrocarbons in both the land and ocean environments and can be used to find other resources including coal, ores, minerals and geothermal energy. For more detection of shallow subsurface features, up to a few tens of meters in depth, electromagnetic waves can be used instead of elastic waves, a technique referred to as ground penetrating radar. All such systems can, according to other embodiments of the present invention, include a pulse processing board comparable to pulse processing board (72) of FIG. 3 for processing the output of the sonic or radar detectors in order to resolve individual signals in the output of those respective detectors.

The method of the present invention may also be employed in many material or product analysis fields. For example, semiconductor processing and fabrication employs high resolution measurement devices and techniques for evaluating parameters of samples; various measurements are performed in which thin films—such as oxides, metals or dielectrics—are deposited on semiconductor substrates of, for example, silicon. Non-destructive techniques are particularly useful for evaluating thickness, identifying impurities and determining the index of refraction of the films to ensure high yields during fabrication. One type of data that is particularly useful in semiconductor fabrication is that relating to the dose and profile of ion implantation of dopants such as arsenic, phosphorus and boron; this data may be obtained with X-ray fluorescence measurements performed at varying small angles, and collected using—for example—an energy-dispersive solid-state detector such as a Si(Li) detector. The method of the present invention may be used to process the output of such a detector in this field.

In automated DNA sequencing, the problem of pulse pile-up (and hence dead-time) may be avoid by ensuring that only one nucleotide is present in a detection region at any given time. However, the need to do so should be substantially reduced—permitting greatly faster data collection—by the use of the method of the present invention.

Similarly, the widespread use of miniaturized electronic circuits creates the need for sophisticated analytical techniques capable of high resolution measurement. For example, photoluminescence lifetime spectroscopy is used to measure photoluminescence in semi-conductors, especially those of compounds such as gallium arsenide that are susceptible to the incidence of structural discontinuities due to local crystallisation defects. Such defects are detected as variations in photoluminescent output, measured with—for example—single photon avalanche diode (SPAD) detectors. The output of such detectors is processed to allow the measurement of the photoluminescent lifetime delay characteristics of the sample under inspection. The rapid decay of photoluminescence in GaAs substrates, for example, allows the use of high repetition rate pulsed laser sources, theoretically permitting a data collection rate of 500,000 counts per second. In practice, pulse pile-up limits the maximum data collection rate in such applications to around 100,000 counts per second due to the finite conversion dead time of even faster commercially available time-to amplitude converter. The method of the present invention, employed to process the data from such detectors, should allow significantly higher data collection rates in these applications.

Modifications within the scope of the invention may be readily effected by those skilled in the art. It is to be understood, therefore, that this invention is not limited to the particular embodiments described by way of example hereinabove.

In the claims that follow and in the preceding description of the invention, except where the context requires otherwise owing to express language or necessary implication, the word "comprise" or variations such as "comprises" or "comprising" is used in an inclusive sense, i.e. to specify the presence of the stated features but not to preclude the presence or addition of further features in various embodiments of the invention.

Further, any reference herein to prior art is not intended to imply that such prior art forms or formed a part of the common general knowledge.

The invention claimed is:

1. A method for resolving individual signals in detector output data, comprising:
   obtaining or expressing the detector output data as a digital series;
   obtaining or determining a signal shape of signals present in the output data;
   forming a transformed signal shape by transforming the signal shape according to a mathematical transform;
   forming a transformed series by transforming the digital series according to the mathematical transform, said transformed series comprising transformed signals;
   evaluating a function of at least the transformed series and the transformed signal shape and thereby providing a function output;
   determining at least one parameter of the function output based on a model of the function output; and
   determining a parameter of the signals from the at least one determined parameter of the function output.

2. A method as claimed in claim 1, comprising forming the model by modeling the function output.

3. A method as claimed in claim 1, wherein said at least one parameter of the transformed signals comprises frequency.

4. A method as claimed in claim 1, including determining a plurality of parameters of the transformed signals.

5. A method as claimed in claim 1, wherein said at least one parameter of the transformed signals comprises frequency and amplitude.

6. A method as claimed in claim 1, wherein the transform is a Fourier transform.

7. A method as claimed in claim 6, wherein the transform is a Fourier transform and the function is representable as $$Y(k)=X(k)/H(k), k \in \{0,1,\ldots N-1\},$$

where $X(k)$ is the transformed series, $H(k)$ is the transformed signal shape and $N$ is the number of pulses.

8. A method as claimed in claim 6, wherein the model comprises a plurality of sinusoids.

9. A method as claimed in claim 1, comprising determining the signal shape by a calibration process.

10. A method as claimed in claim 1, comprising validating the parameter of the signals.

11. A method as claimed in claim 1, wherein said data includes signals of different forms, and the method includes determining where possible the signal shape of each of the signals.

12. A method for pulse pile-up recovery from detector output data, comprising the method for resolving individual signals in detector output data according to claim 1.

13. An apparatus for resolving individual signals in detector output data, the apparatus comprising:
   a processor for receiving the data as a digital series, and programmed to: obtain or determine a signal shape of signals present in the output data according to a method described in claim 1.

14. An apparatus for pulse pile-up recovery from detector output data, comprising the apparatus for resolving individual signals in detector output data according to claim 13.

15. An apparatus as claimed in claim 14, wherein the processor is programmed to form the model by modeling the function output.

16. An apparatus as claimed in claim 13, comprising an electronic computing device in data communication with the processor, adapted to control the processor and to display an output of the processor.

17. A system comprising an apparatus as claimed in claim 13 wherein the system is:
   a radiation detector,
   a landmine detector,
   an imaging apparatus,
   a mineral detection apparatus,
   an oil well logging apparatus,
   an unexploded ordnance detector,
   a cargo screening apparatus,
   an X-ray fluorescence or X-ray diffraction apparatus,
   a sonic pulse, sound or seismic detector,
   a vibration detector,
   a nucleic acid sequencing apparatus,
   a radar system,
   a reflection seismology system, or
   a semiconductor analysis system.

18. An apparatus for resolving individual signals in detector output data, the apparatus comprising a processor configured to:
   obtain a signal form characterizing the detector;
   obtain digitized detector output data in a form of a digital time series;
   make parameter estimates of one or more parameters of at least one signal present in the detector output data, wherein the one or more parameters comprise at least a signal temporal position of the at least one signal; and
   determine the amplitude of the at least one signal based on a mathematical model, the amplitude being indicative of an event;
   wherein the mathematical model is based on the digital time series and a function of at least the signal form, the temporal position of the at least one signal, and the amplitude of the at least one signal, and said apparatus is provided in or constitutes:
   a sonic pulse, sound or seismic detector,
   a vibration detector,
   biological assay apparatus,
   a nucleic acid sequencing system,
   a radar system,
   a reflection seismology system, or
   a semiconductor analysis system.

19. An apparatus as claimed in claim 18, wherein said processor is configured to form the mathematical model.

20. A method of resolving individual signals in detector output data, the method comprising:
   obtaining a signal form characterizing the detector;
   obtaining digitized detector output data in a form of a digital time series;

making parameter estimates of one or more parameters of at least one signal present in the detector output data, wherein the one or more parameters comprise at least a signal temporal position of the at least one signal; and determining the amplitude of the at least one signal based on said mathematical model, the amplitude being indicative of an event;

wherein the mathematical model is based on the digital time series and a function of at least the signal form, the temporal position of the at least one signal, and the amplitude of the at least one signal; and wherein said method is employed in or with a sonic pulse, sound or seismic detector, a vibration detector, a biological assay apparatus, a nucleic acid sequencing system, a radar system, a reflection seismology system, or a semiconductor analysis system.

* * * * *